May 19, 1925.
F. H. JONES
CLOVER AND ALFALFA HULLING MACHINE
Filed Feb. 20, 1924
1,538,402
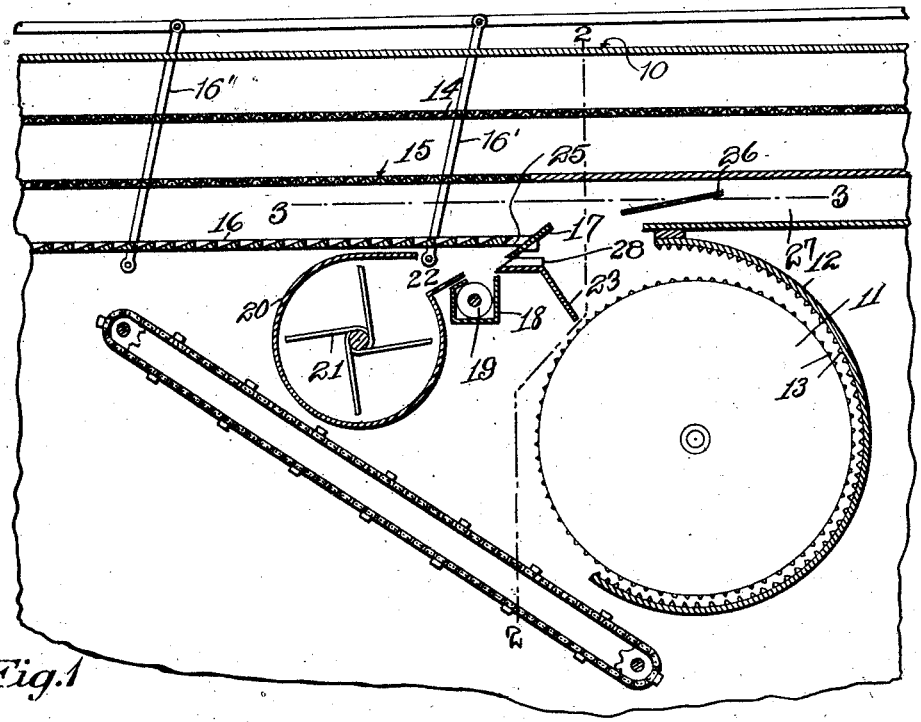
Fig.1
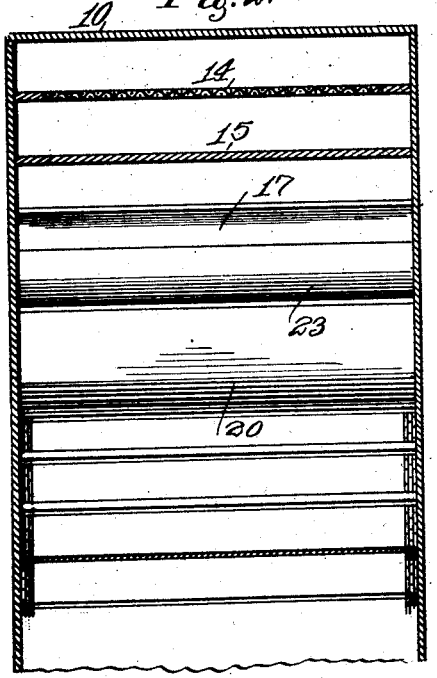
Fig.2.
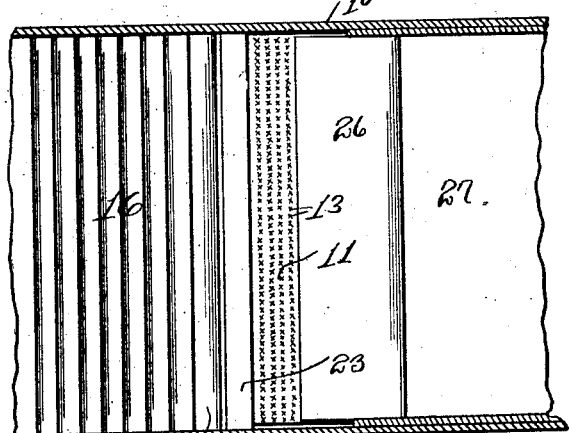
Fig.3.
Inventor
Frank H. Jones.
Attorney Patented May 19, 1925.

1,538,402

UNITED STATES PATENT OFFICE.

FRANK H. JONES, OF CASSOPOLIS, MICHIGAN.

CLOVER AND ALFALFA HULLING MACHINE.

Application filed February 20, 1924. Serial No. 694,092.

*To all whom it may concern:*

Be it known that I, FRANK H. JONES, a citizen of the United States, residing at Cassopolis, in the county of Cass, State of Michigan, have invented certain new and useful Improvements in Clover and Alfalfa Hulling Machines; and I do hereby declare the following to be a full, clear, and exact description of the invention, such as will enable others skilled in the art to which it appertains to make and use the same.

This invention relates to new and useful improvements in clover and alfalfa hulling machines, and particularly to safety devices therefor.

The principal object of the invention is to provide a device of this character by means of which stones, and other hard objects, may be effectively prevented from passing to and damaging the faces of the hulling cylinder and concave.

In some devices of this character, heretofore, provision has been made for swinging the concave away from the cylinder, when a hard object has passed therebetween, this movement of the concave being accomplished by hand. This has proven very unsatisfactory because of the fact that the operator does not release the concave until the hard object has passed between the cylinder and concave, when the damage to the faces of the cylinder and concave has been accomplished. Furthermore, this requires the stopping of the machine, and it is apparent that serious damage, such as the causing of fire, cannot be prevented because the operator cannot release the concave and stop the machine quickly enough to prevent damage.

It is with this in view that the present invention has been devised, and it is a further object to provide for the quick passage of the hard objects out of the machine, before reaching the cylinder and concave, while at the same time permitting the clover or alfalfa to pass to the said cylinder and concave.

Other objects and advantages will be apparent from the following description when taken in connection with the accompanying drawings.

In the drawings:

Figure 1 is a vertical longitudinal central sectional view of a portion of a clover hulling machine showing the invention therein.

Figure 2 is a vertical transverse sectional view on the line 2—2 of Figure 1.

Figure 3 is a horizontal sectional view on the line 3—3 of Figure 1, looking downwardly.

Referring particularly to the accompanying drawing, 10 represents the frame of a clover hulling machine in which is mounted the cylinder 11, and the associated concave 12. The surfaces of the cylinder and of the concave are provided with the usual rasps 13, for separating the seeds from the hulls. The clover is fed into the machine onto the screen 14, from whence it is separated, the smaller particles, and seeds falling therethrough and onto the screen 15, next below. The material is further separated by this second screen, and the seeds and the finer chaff drop onto the shaker 16, said shaker being suspended by the links 16'. The screens 14 and 15, as well as the table 16, are operated by any suitable and well known mechanism to produce a shaking motion, said mechanism not being shown. Carried by the end of the shaker 16, adjacent the cylinder 11, is an upwardly inclined baffle plate 17, which extends throughout the entire width of the machine, said plate being formed from rubber and fabric. In the said end of the shaker 16, inwardly of the baffle plate 17, is an opening which discharges into the laterally extending trough 18, and in which trough is disposed a screw conveyor 19. Beneath said end of the shaker 16 is disposed the housing 20, of the blower fan 21, the discharge 22 of which is directed to blow through the opening 25, whereby the seeds and chaff will be caused to pass over the said plate and the said opening. Immediately thereafter the seeds and heavier particles of chaff will fall from the blast of air directly to the cylinder and concave, being guiding by the inclined board 23, which board is mounted on the transverse beam 28. The lighter particles will pass beyond the inclined board 26, and will thereafter fall from the blast of air, to be conveyed out of the machine.

By this construction small stones, bolts, nuts, or other hard objects which might pass into the machine with the clover or alfalfa, will strike against the baffle plate 17, and fall through the opening 25, formed in the end of the shaker 16, inwardly of said plate, and be carried out of the machine, by means of the screw conveyor 19. The foreign objects which do not fall directly from the baffle 17, through the opening 25, to the conveyor 19, will lodge on the transverse beam 28, to be wiped off by the lower edge of the baffle 17, which contacts with the upper face of the beam.

As the bearings of the suspending links 16' wear, the shaker 16 will settle to a lower level, with the result that the baffle will more closely contact with the face of the beam. The fact that the baffle 17 is formed of flexible material, such as rubber and fabric, permits the same to retain its firm frictional contact with the beam 28, without interfering with the proper action of the shaker 16. Thus, at each reciprocation of the shaker 16 the baffle 17 will wipe completely across the upper face of the beam 28, to force foreign objects which have lodged thereon, off into the conveyor 19. Thus these heavy and hard objects will be effectively prevented from passing to the cylinder and concave, with the result that damage to the parts is avoided, as well as the danger of fire removed.

The air is discharged from the machine through the tube 27, as clearly seen in Figure 1, and within this tube, and extending transversely thereof, is the inclined baffle plate 26.

What is claimed is:

1. The combination with the cylinder and concave and return shaker of a hulling machine, of an inclined baffle mounted on the end of the shaker and cooperating with the end of the shaker to form an outlet opening for foreign objects, said baffle being positioned to receive foreign objects thereagainst, a conveyor beneath the opening, and a blower mounted beneath the shaker and in position to discharge through said opening to cause seeds and chaff to pass thereover.

2. In a hulling machine, the combination with the cylinder and concave and the return shaker, said shaker having an outlet opening, a baffle on the shaker and forming a wall of said opening, a conveyor beneath the opening, and a blower disposed to discharge through said opening.

3. In a hulling machine, the combination with the cylinder and concave and the return shaker, of a baffle mounted on an end of the shaker and cooperating with the end thereof to form an outlet opening for foreign objects, means beneath said opening on which foreign objects lodge and frictionally contacted by said baffle whereby to remove said lodged objects and direct them through the opening, and a conveyor beneath said opening for receiving the foreign objects.

4. In a hulling machine, the combination with the cylinder and concave and the return shaker, of a flexible baffle mounted on an end of the shaker and spaced therefrom to provide a foreign object outlet opening, a conveyor beneath the opening for receiving foreign objects, and a transverse member with which said baffle frictionally wipes to prevent entrance of foreign objects into the cylinder and concave, and whereby said objects will be positively discharged into said conveyor.

In testimony whereof, I affix my signature, in the presence of two witnesses.

FRANK H. JONES.

Witnesses:
 ROBERT S. PAUGBUM,
 WILLIAM H. BERKEY.